US007246153B2

(12) United States Patent
Tsuchitoi

(10) Patent No.: US 7,246,153 B2
(45) Date of Patent: Jul. 17, 2007

(54) INFORMATION MANAGEMENT APPARATUS, DEVICE CONTROL APPARATUS, INFORMATION MANAGEMENT METHOD, AND MEMORY MEDIUM STORING PROGRAM

(75) Inventor: Naoki Tsuchitoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 10/023,747

(22) Filed: Dec. 21, 2001

(65) Prior Publication Data

US 2002/0091822 A1 Jul. 11, 2002

(30) Foreign Application Priority Data

Dec. 27, 2000 (JP) ............................. 2000-397722

(51) Int. Cl.
*G06F 15/16* (2006.01)
*G06F 15/00* (2006.01)

(52) U.S. Cl. ...................... 709/217; 709/223; 358/1.15

(58) Field of Classification Search ........ 709/201–203, 709/217–219, 223–225
See application file for complete search history.

(56) References Cited

U.S. PATENT DOCUMENTS

| 5,611,046 A | 3/1997 | Russell et al. ............ 395/200.1 |
| 5,852,746 A | 12/1998 | Barrett ........................ 595/837 |
| 6,003,078 A | 12/1999 | Kodimer et al. ............ 709/224 |
| 6,119,156 A * | 9/2000 | Filion et al. ................. 709/220 |
| 6,219,718 B1 | 4/2001 | Villalpando .................. 709/317 |
| 6,477,567 B1 * | 11/2002 | Ohara ......................... 709/223 |
| 6,532,491 B1 * | 3/2003 | Lakis et al. ................. 709/223 |
| 6,581,101 B2 | 6/2003 | Villalpando ................. 709/230 |
| 6,615,372 B1 * | 9/2003 | Wang .......................... 714/46 |
| 6,631,407 B1 * | 10/2003 | Mukaiyama et al. ........ 709/223 |

FOREIGN PATENT DOCUMENTS

| EP | 0 930 748 A2 | 7/1999 |
| JP | 11-134140 | 5/1999 |
| JP | 2000-149632 | 5/2000 |
| JP | 2000-194640 | 7/2000 |

OTHER PUBLICATIONS

U.S. Appl. No. 10/081,839, filed Feb. 25, 2002.
U.S. Appl. No. 09/324,512, filed Jun. 3, 1999.

* cited by examiner

*Primary Examiner*—Glenton B. Burgess
*Assistant Examiner*—Yasin Barqadle
(74) *Attorney, Agent, or Firm*—Fitzpatrick, Cella, Harper & Scinto

(57) ABSTRACT

In case that there are a plurality of models, a printer of each model has information specific to the individual model and a message in accordance with the individual model is required for management of apparatus. Therefore, a network card module must have specific information on all models. There, in the present invention, Web contents data is classified into machine dependent ones and machine independent ones and the dependent ones are disperse-disposed in a printer and the independent ones are disperse-disposed in a network card unit.

31 Claims, 16 Drawing Sheets

FIG. 2

```
<!DOCTYPE HTML PUBLIC "-//IETF//DTD HTML 2.0//EN" >

<HTML>

<HEAD>

<TITLE>Web Console Interface</TITLE>

</HEAD>

<BODY>

<IMG SRC= "/dev/device.png" >

<IMG SRC= "/nic/error.png" >

</BODY>

</HTML>
```

14-1:
STANDARD
CONSTRUCTION 14-4:
STANDARD CONSTRUCTION
+DUPLEX 14-2:
250-SHEETS
CASSETTE 14-5:
250-SHEETS CASSETTE
+DUPLEX 14-3:
500-SHEETS
CASSETTE 14-6:
500-SHEETS CASSETTE
+DUPLEX

FIG. 15

| BITMAP IMAGE | 250-SHEETS CASSETTE | 500-SHEETS CASSETTE | DUPLEX |
|---|---|---|---|
| 14-1 | ABSENT | ABSENT | ABSENT |
| 14-2 | PRESENT | ABSENT | ABSENT |
| 14-3 | ABSENT | PRESENT | ABSENT |
| 14-4 | ABSENT | ABSENT | PRESENT |
| 14-5 | PRESENT | ABSENT | PRESENT |
| 14-6 | ABSENT | PRESENT | PRESENT |

FIG. 19

```
1: <!--#if expr= "ENV=VALUE1" -->
2:      SYNTAX A
3: <!--#elif expr= "ENV=VALUE2" -->
4:      SYNTAX B
5: <!--#else-->
6:      SYNTAX C
7: <!--#endif-->
```

FIG. 20

```
<!--#if expr= "LOW-CASSETTE-EXIST=TURE" -->
  <HTML INSCRIPTION CONCERNING LOWER CASSETTE>
<!--#endif-->
```

INFORMATION MANAGEMENT APPARATUS, DEVICE CONTROL APPARATUS, INFORMATION MANAGEMENT METHOD, AND MEMORY MEDIUM STORING PROGRAM

BACKGROUND OF THE INVENTION

1. Field of the Invention

The present invention relates to information management apparatus and information management methods for providing information on a device for management the device.

2. Description of the Related Art

In recent years, with spread of Internet, also as for printers, a form of use in a network has been generalized. Usually, as for high-price machines such as high-speed machines and color machines, although there is a tendency that a network interface is incorporated in a machine, in case of low-price monochrome machines, a form is general in which a network interface is not packed with a main body but provided separately as a network card module (or a network board).

In this case, the printer main body and the network card module are intelligent machines each having a CPU, and the respective machines perform communications through connection interfaces and mount desired services.

By this, a heavy load network service can be performed by the network card module, and further, by the absence of load of the network service, the CPU of the printer main body and the peripheral performance can be lowered. Thus, a reduction of cost of the printer main body can be intended.

However, in a conventional network interface, although only transmission of print data from a host computer represented by, for example, lpr, to the printer may be performed, nowadays, needs of performing information management of the printer from the host computer have increased. For this purpose, various means as additional techniques are provided.

The simplest example is a form in which information management data (job control language) is also transmitted by a port for transmitting print data. In the job control language, because of commonly having the port for sending the print data, there is no need of separately increasing a service port and the mount is relatively easy.

However, if a large amount of print data is transferred by the port, since the port is occupied by the transfer of the print data, there is a problem that exchange of information management data stops. Besides, in a protocol of a one-way type connection such as an lpr protocol, to begin with, although it can control the printer from the host computer, there is a defect that it can not acquire information.

As the next technique, there is a system using SNMP/MIB. This is a method in which, using an exclusive port for data transmission/reception, using SNMP (Simple Network Management Protocol) as a normal standard, information management of the printer is performed from the host computer.

However, in this system, it is required to originally develop an exclusive client program for acquiring MIB information using SNMP and providing UI (User Interface) for information management of the printer. In addition, in this system, since, to begin with, SNMP is a protocol for performing exchange of simple information, in MIB, only a simple database such as numerals, letter strings, or the like.

As a result, information necessary for constituting UI for information management, such as a bit map image visually showing a construction of equipment, must be owned by a client program. Attendant upon this, there is a problem point that the client program must be in machine kind correspondence by each machine kind of the printer.

SUMMARY OF THE INVENTION

So, by the manner that the network card module provides, by an HTTP (Hyper Text Transfer Protocol) service, Web contents data such as HTML (Hyper Text Markup Language) data indicating equipment information, bit map image data (bit map data), or the like, and in a client (host computer), a general Web browser displays the above-mentioned Web contents data on GUI, and an operation by a user is made possible, even without an exclusive client program, it is possible to obtain the same effect.

Since the above-described HTTP service is one function of a network, it is a function that can be mounted on the network card module. And, for a reduction of development cost by being made in common and a reduction of product cost by mass production, usually, the network card module is designed so as to be able to be connected to a plurality of models (machine kinds) of printers.

However, in case that there are a plurality of models, each model of printer has information specific to the individual model and a message in accordance with the individual model is required for management of the machine. For this reason, for the network card module supporting those all specific information, the network card module must have specific information of all models, the ROM capacity of the network card module increases, and the cost also increases.

Further, for making the network card module cope with specific information on a printer that will be put on the market after the publication of the network card module, each time, rewrite of the firmware of the network card module must be performed. For this reason, there is a problem point that the maintenance work more than necessity arises and further the cost becomes high.

In order to solve the above problems, an information management apparatus according to the present invention is an information management apparatus for transmitting contents data indicating information on a device to an external apparatus, comprising: acquisition means for acquiring the contents data from a storage unit in the information management apparatus when the contents data is not dependent upon a machine kind of the device, and acquiring the contents data from a storage unit in the device when the contents data is dependent upon the machine kind of the device; and transmission control means for controlling so that the contents data acquired by the acquisition means may be transmitted to the external apparatus.

Further, the information management apparatus according to the present invention is wherein, when the contents data is dependent upon the machine kind of the device, the acquisition means transmits a request of the contents data to the device, and receives the contents data from the device.

Further, the information management apparatus according to the present invention is characterized by comprising: judgment means for, when the contents data is transmitted in response to a request from the external apparatus, judging, on the basis of identification information for identifying the contents data, included in the request, as to whether the contents data is stored in the storage unit in the information management apparatus or stored in the storage unit in the device, wherein, in accordance with a judgment result by the judgment means, the acquisition means acquires the contents data from the storage unit in the information management apparatus or the storage unit in the device.

Further, the information management apparatus according to the present invention is wherein the identification information is a path name, and the judgment means judges, on the basis of a directory part included in the path name, as to whether the contents data is stored in the storage unit in the information management apparatus or stored in the storage unit in the device.

Further, the information management apparatus according to the present invention is characterized by comprising: judgment means for judging, on the basis of a list indicating the contents data dependent upon the machine kind of the device, as to whether the contents data is stored in the storage unit in the information management apparatus or stored in the storage unit in the device, wherein, in accordance with a judgment result by the judgment means, the acquisition means acquires the contents data from the storage unit in the information management apparatus or the storage unit in the device.

Further, the information management apparatus according to the present invention is wherein the identification information is URL-inscribed.

Further, the information management apparatus according to the present invention is characterized in that the data is transmitted to the external apparatus, based on HTTP.

Further, the information management apparatus according to the present invention is characterized by being a network board attached to the device.

Further, the information management apparatus according to the present invention is characterized in that the contents data is requested from the external apparatus, based on document data for display for displaying information on the device by a browser.

Further, the information management apparatus according to the present invention is characterized in that the device is a laser beam printer.

Besides, an information management apparatus according to the present invention is a device control apparatus for providing contents data indicating information on a device, in response to a request, characterized by comprising: judgment means for judging an equipment construction of the device; and specifying means for specifying, of a plurality of contents data indicating the equipment construction, contents data corresponding to the equipment construction judged by the judgment means, wherein the contents data specified by the specifying means is contents data to be provided in response to the request.

Further, the information management apparatus according to the present invention is characterized in that the device control apparatus connects with an information management apparatus for transmitting contents data indicating information on the device to an external apparatus, and in response to a request from the information management apparatus, provides contents data to the information management apparatus.

Further, the information management apparatus according to the present invention is characterized in that the information management apparatus is a network board attached to the device.

Further, the information management apparatus according to the present invention is characterized in that the equipment construction concerns a paper feed apparatus attached, and corresponding contents data exists by each combination of attached paper feed apparatus.

Further, the information management apparatus according to the present invention is characterized in that the judgment means judges a connection of option equipment attached to the device, and contents data provided in response to a request indicates a connection state of option equipment.

Further, the information management apparatus according to the present invention is characterized by being a laser beam printer.

Besides, an information management apparatus according to the present invention is an information management apparatus for transmitting document data for displaying information on a device to an external apparatus, characterized by comprising: acquisition means for acquiring an equipment construction of the device from the device, and control means for controlling so that a syntax for displaying the equipment construction acquired by the acquisition means may be included in the document data and the document data may be transmitted to the external apparatus.

Further, the information management apparatus according to the present invention is characterized in that the equipment construction concerns a paper feed apparatus attached, and in accordance with the attached paper feed apparatus, a syntax for displaying information on the paper feed apparatus is included in the document data.

Besides, an information management apparatus according to the present invention is an information management apparatus for transmitting document data for displaying information on a device to an external apparatus, characterized by comprising: acquisition means for acquiring an equipment state of the device from the device, and control means for controlling so that a message corresponding to the equipment state acquired by the acquisition means may be included in the document data and the document data may be transmitted to the external apparatus.

Further, the information management apparatus according to the present invention is characterized by comprising: message acquisition means for acquiring a message dependent upon a machine kind of the device, which is the message, from the device.

BRIEF DESCRIPTION OF THE DRAWINGS

FIG. 2 is a view showing an example of inscription of HTML (Hyper Text Markup Language);

FIG. 15 shows combinations of equipment constructions by option;

FIG. 19 is a view showing a format of a form of SSI; and

FIG. 20 is a view showing an example of WWW contents data using SSI.

DETAILED DESCRIPTION OF THE PREFERRED EMBODIMENTS

Hereinafter, a specific embodiment of the present invention will be shown.

Figure 1:
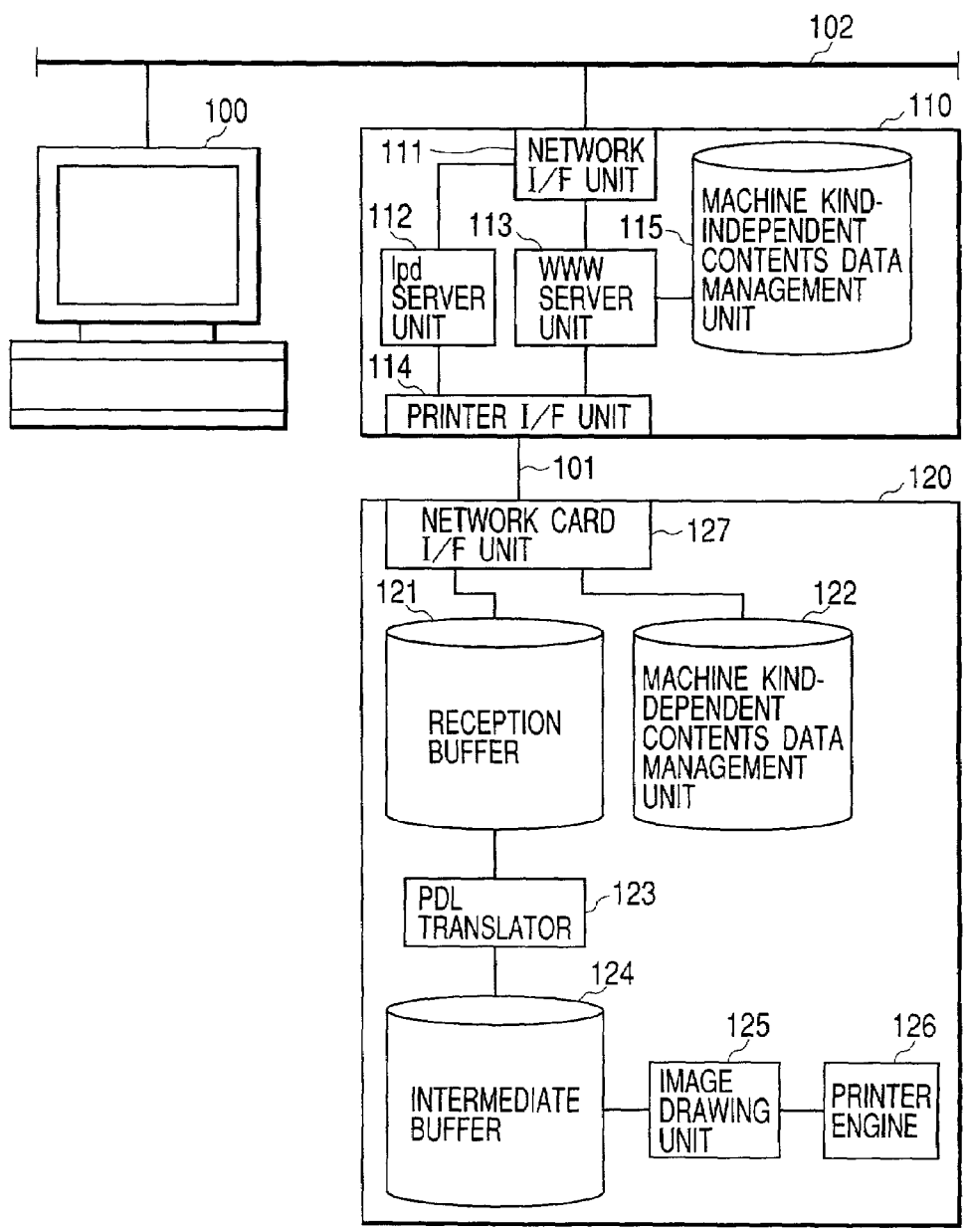
FIG. 1 is a typical view showing the construction of a printing system.

FIG. 1 is a typical view showing the construction of a printing system according to the present invention.

The system of FIG. 1 is made up of a host computer 100, a printer 120, and a network 102 such as Ether-Net for connecting them. Besides, to the printer 120, a network card unit 110 for connecting this printer to the network is attached through a printer-network card interface 101. This network card unit may be called network board, network interface, or network box.

The network card unit 110 is made up of a network I/F unit 111 for having a communication with a communication medium 102 and passing data to the subsequent stage in accordance with a service, an ldp server unit 112 for receiving print data transmitted from the host computer 100, a WWW server unit 113 (HTTP server unit) 113 for transmitting/receiving, using HTTP, a state of the printer 101 requested from the host computer 100, a printer I/F unit 114 for instructing the printer 120 to transfer print data or machine-dependent contents data, and a machine-independent contents data management unit 115 for storing HTML data (HTML contents data) and bit map data (bit map contents data) independent of machine kind.

On the other hand, the printer 120 is made up of a network card I/F unit 127 for having a communication with the printer I/F unit 114 and passing data to the subsequent stage in accordance with a service, a reception buffer 121 constituted by a RAM or HD for receiving and storing print data, a machine kind-dependent contents data management unit 122 for storing HTML data (HTML contents data) and bit map data (bit map contents data) dependent upon machine kind, a PDL translator 123 for taking out print data having entered the reception buffer, analyzing PDL (Page Description Language) data, and converting it into intermediate data for image drawing, an intermediate buffer 124 for temporarily storing the intermediate data generated by the PDL translator 123, an image drawing unit 125 for taking out the intermediate data, converting it into raster data, and then passing it to a printer engine, and the printer engine 126 for printing letters on a paper on the basis of the raster data generated by the image drawing unit 125, using a known electrophotographic technique or ink jet technique, and then discharging the print paper.

Next, Web contents data will be described. The WWW server unit 113 is for making it possible to perform a state monitor of the printer 120, an initial value set, and a job control of print job from a WWW browser executed on the host computer 100. In particular, as the internal construction, the WWW server unit 113 operates as a database for providing Web contents data requested from the host computer 100.

FIG. 2 is a view showing an example of inscription of HTML (Hyper Text Markup Language) used here. This inscription has been simplified for making a description and actually a further complicated document is described.

In FIG. 2, the line of <!DOCTYPE HTML PUBLIC "//IETF//DTD HTML 2.0//EN"> is a document type declaration in an SGML document, and it indicates that the document is described in HTML.

In the region surrounded by <HTML> and </HTML>, the actual contents of the HTML document is described. In particular, the region surrounded by <HEAD> and </HEAD> indicated the header region of the HTML document, and a letter string "Web Console Interface" surrounded by <TITLE> and </TITLE> represents a theme of the document. The region surrounded by <BODY> and </BODY> indicates the interior of the HTML documents, wherein two images have been taken in.

Figure 3:
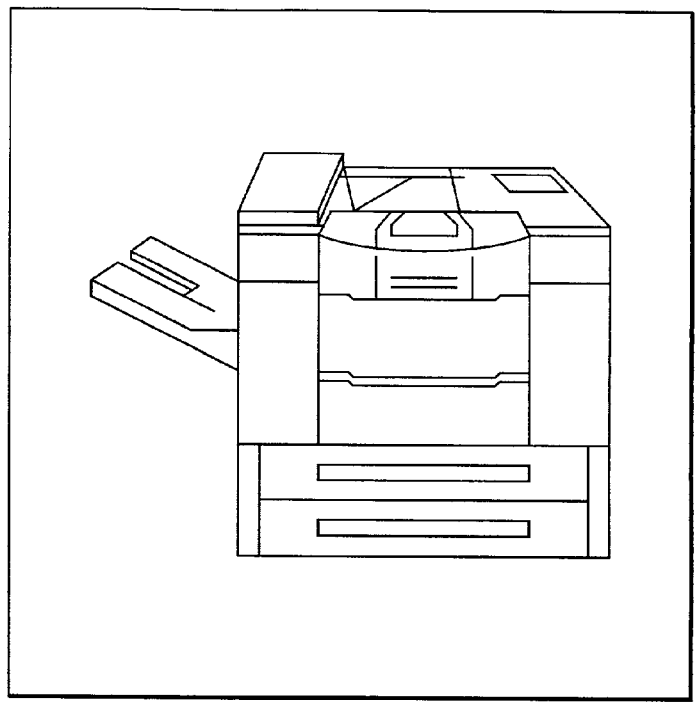
FIG. 3 is a general view of an image that the first image data indicates.

The first image data is <IMG SRC="/dev/device.png">. FIG. 3 is a general view of an image indicated by this first image data. Since "/dev/device.png" is not an URL inscription, it is known that it is internal data existing in the interior of the network card unit 110 or the printer 120. Further, "/dev/device.png" is image data indicating a general view of the printer 120. Consequently, this is machine kind-dependent Web contents data dependent upon machine kind of the printer 120. Therefore, since there is a difference in general view between different kinds of printers, for example, a color machine kind printer and a printer of a machine kind less in step number of cassettes, "/dev/device.png" of the respective printers display different images.

Figure 4:
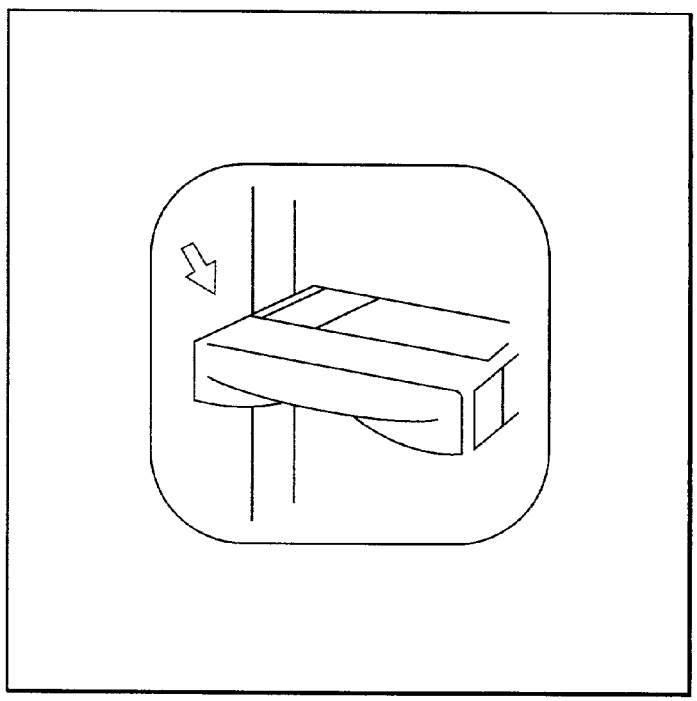
FIG. 4 is a general view of an image that the second image data indicates.

The second image data is <IMG SRC="/nic/error.png">. FIG. 4 is a general view of an image indicated by this second image data. Since this is also not an URL inscription like the former example, it is known that it is internal data of the network card unit 110 or the printer 120. Further, since "/nic/error.png" is an abstract image indicating to urge cassette paper feed, it is machine kind-independent Web contents data independent of machine kind.

In this way, in Web contents data, when being generally divided, there are those dependent upon machine kind and those independent of machine kind. So, in the network card unit 101, to support in relation to a plurality of models of printers 120 by a single product, Web contents data dependent upon machine kind is stored in the machine kind-dependent contents data management unit 122 existing in the printer 120 and Web contents data independent of machine kind is stored in the machine kind-independent contents data management unit 115 existing in the network card unit 101. As for Web contents data stored in the machine kind-dependent contents data management unit 122, those in accordance with machine kind are stored. For example, "device.png" of FIG. 3 indicates a general view of a certain specific machine kind of printer.

Incidentally, as for identification information for identifying Web contents data, there are a file name, URL (Universal Resource Location), etc.

Figure 16:
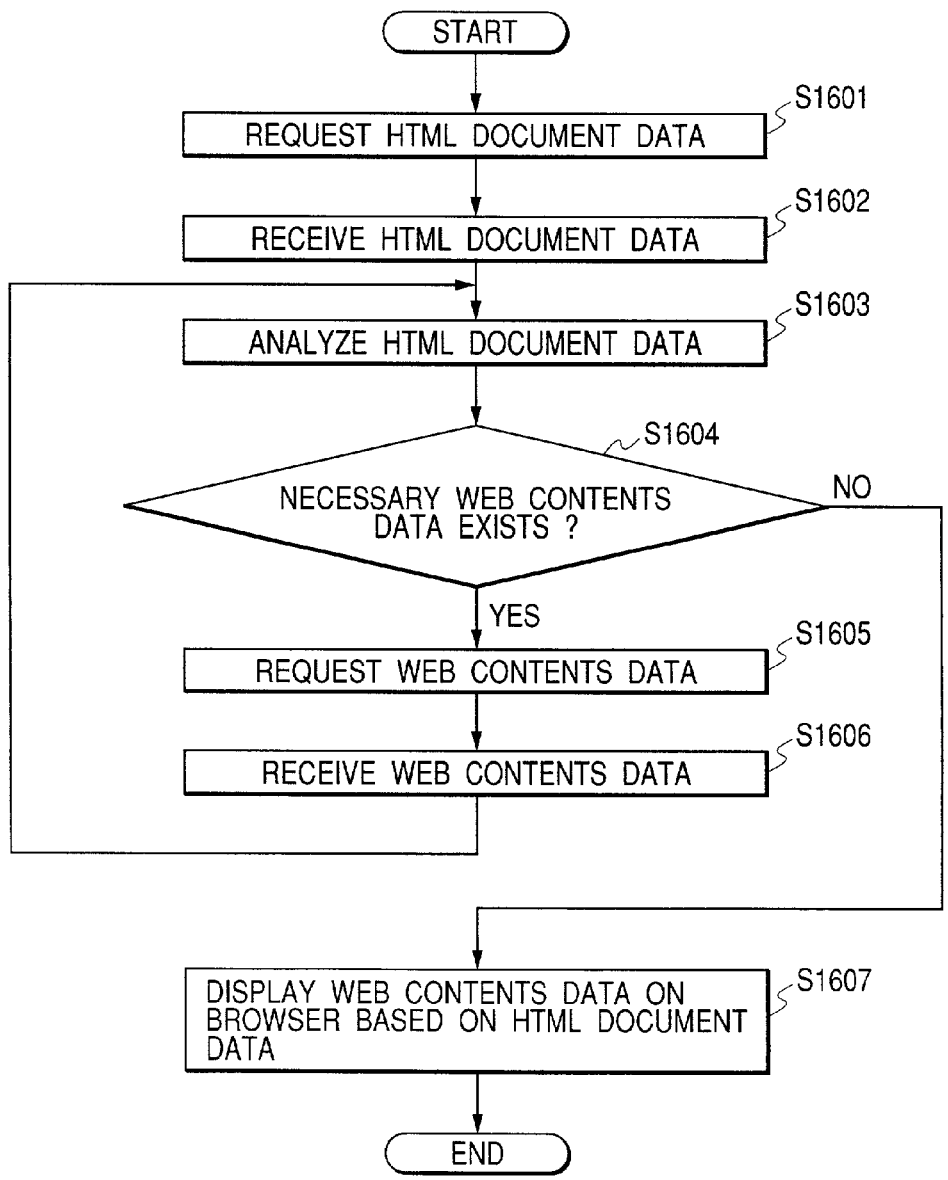
FIG. 16 is a flowchart showing processing when a Web browser displays information on a printer.

FIG. 16 is a flowchart showing processing when a Web browser executed on the host computer 100 displays information on the printer 120. In the Web browser, this process usually starts in response to a user inputting a network address allocated to the printer 120 (or the network card 110).

First, a request command requesting HTML document data for displaying information on the printer 120 is transmitted toward the network card unit 110 (step S1601). An example of this HTML document is shown in FIG. 2. And, in response to the request, HTML document data sent from the above-mentioned network card unit 110 is received (step S1602).

Next, the received HTML document data is analyzed (step S1603) to judge as to whether or not Web contents data necessary for display exists (step S1604). If exists (step S1604—YES), next, a request command requesting the Web contents data (hereinafter also referred to as GET operation) is transmitted to the network card unit 110 (step S1605), and the Web contents data is received (step S1606).

Further, in step S1603, the analysis of the HTML document data is continued, the flow advances to step S1605 every time when necessary Web contents data exists, and the flow advances to step S1607 when necessary Web contents data becomes absent.

Figure 13:
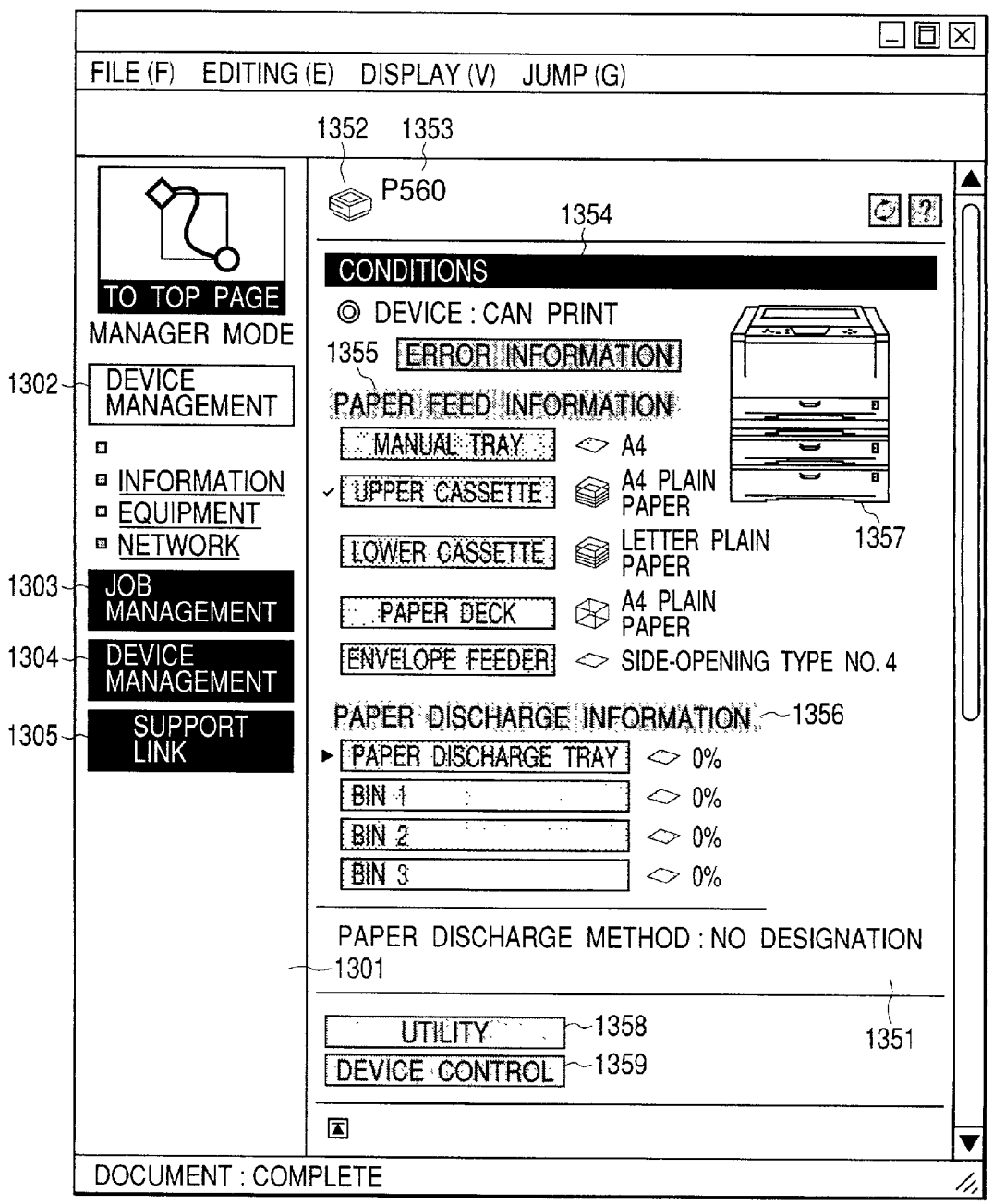
FIG. 13 is a view showing a display screen on which a WWW browser being executed on a host computer displays HTML contents data or bit map contents data provided by the WWW server unit.

Finally, a display layout of the Web contents data is determined on the basis of the HTML document data and the Web contents data is displayed (step S1607). As a result, a picture as in FIG. 3 or 4 is displayed on the Web browser and the user can visually confirm the information on the printer. FIG. 13 is an example of screen displayed on the Web browser by this process.

Next, how the Web server unit 13 acquires these machine kind-dependent Web contents data and machine kind-independent Web contents data with being divided, in response to the request from the Web browser will be described. First, for distinguishing the difference between both, a directory structure is used. In case of Web contents data staring from /dev/, it is judged to be machine kind-dependent Web contents data and it is acquired from the machine kind-dependent contents data management unit 122, while, in case of Web contents data staring from /nic/, it is judged to be machine kind-independent Web contents data and it is acquired from the machine kind-independent contents data management unit 115.

Figure 5:
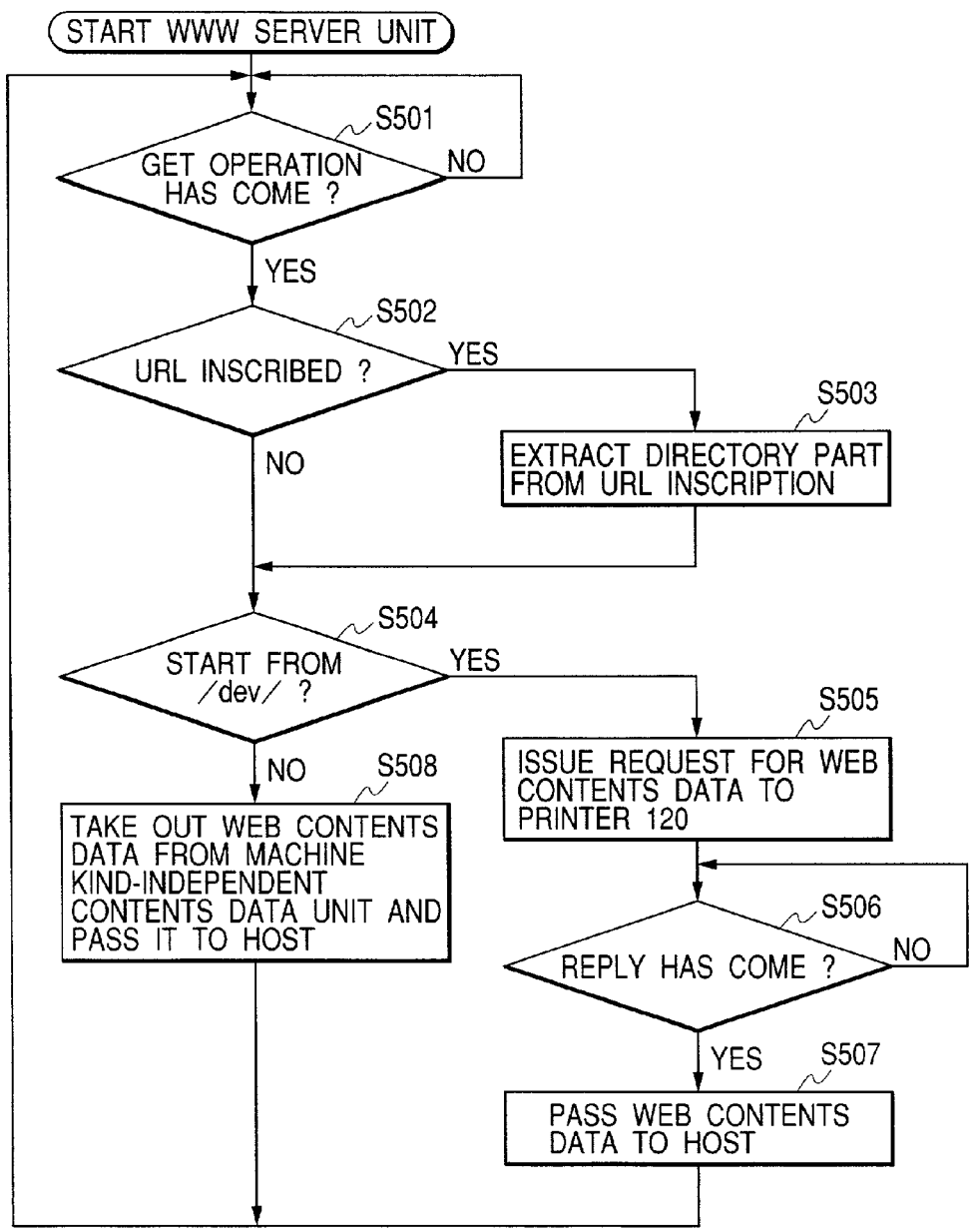
FIG. 5 is a flowchart showing a processing operation of a WWW server unit.

FIG. 5 is a flowchart showing a processing operation of the WWW server unit 113. The WWW server unit 113 is activated with the activation of the printer 120 and provides services continuously till the power source is cut off.

When a service is started, first, to wait for a GET operation, it is judged whether or not the GET operation has been received from the network (step S501). The GET operation is an operation for requesting Web contents data in HTTP.

When the GET operation has come (step S501—YES), it is checked what is the requested Web contents data, and it is checked whether or not it is URL-inscribed (step S502). When being URL-inscribed (step S502—YES), a directory part is extracted from the URL inscription (step S503). For example, in case that the designated Web contents name is "http://printer.domain/dev/device.html", "http://" is judged to be a scheme and "printer.domain" is judged to be a domain name. And, both are excluded and only "/dev/device.html" is taken out as the directory part.

Further, it is checked whether or not the directory part starts from "/dev/" (step S504). As described above, any Web contents name starting from "/dev/" is acquired from the printer as machine kind-dependent contents data.

Therefore, in case of starting from "/dev/" (step S504—YES), an acquisition request of the Web contents data is issued to the printer 120 (step S505). And, by judging as to whether or not a reply has come (step S506), the replay is waited for, and when the reply has come (step S506—YES), by a reply form of HTTP, the requested Web contents data is transferred to the host computer 100. In case that it is not Web contents data staring from "/dev/" (step S504—NO), since it is Web contents data owned by the network card unit 101, the Web contents data is acquired from the machine kind-independent contents data management unit 115 and by a reply form of HTTP, the Web contents data is provided to the host computer 100.

In case that the WWW server unit 113 acquires Web contents data starting from "/dev/", from the machine kind-dependent contents data management unit 122 in the printer 120, a remote function call for executing read-in of Web contents data through the printer I/F unit 114 and the network card I/F unit 127 is executed. The remote function call is for requesting file transfer to the printer 120 from the network card unit 110.

Figure 8:
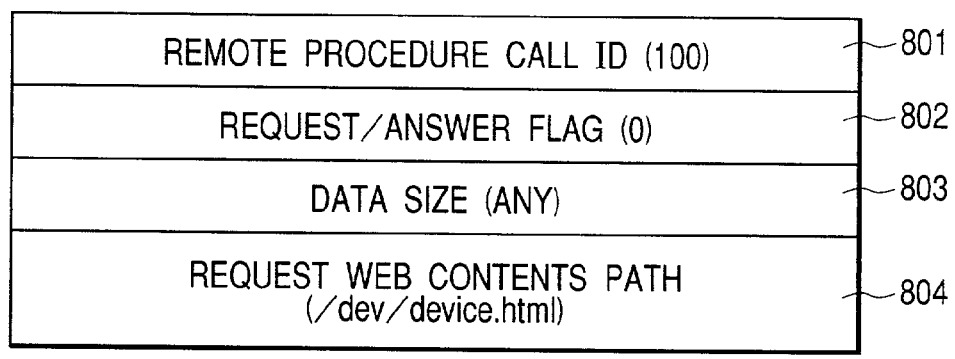
FIG. 8 is a view showing a packet form of a request packet instructing to read out Web contents data by a remote function call.

FIG. 8 is a view showing a packet form of a request packet instructing to read out Web contents data by a remote function call. In FIG. 8, the request packet is constituted by "Remote Procedure Call ID 801, Request/Answer Flag 802, Data Size 803, Request Web Contents Path 804".

"Remote Procedure Call ID 801" is an ID indicating a read out request of Web contents data, and it is a numerical value 100 in FIG. 8. "Request/Answer Flag 802" indicates whether this packet is a request or a reply, and it is a numeral 0 (request) in FIG. 8. "Data Size 803" indicates the data size of the packet. "Request Web Contents Path 804" indicates the path of the requested Web contents data, and it is "/dev/device.html" in FIG. 8.

Figure 9:
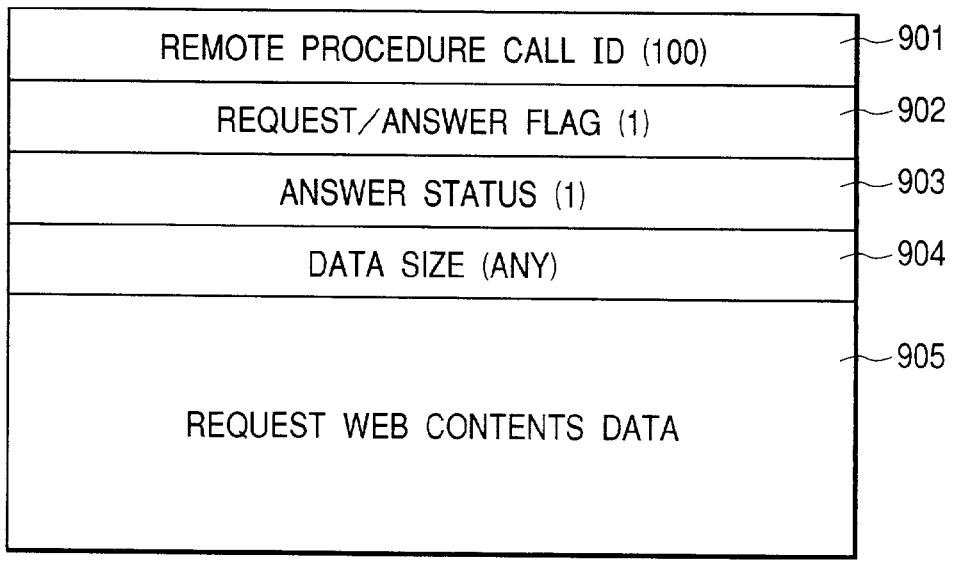
FIG. 9 is a packet form of a reply packet transmitting Web contents data to the request packet instructing to read out Web contents data by a remote function call.

When the packet is rightly interpreted by the network card I/F unit 127, a reply packet is transmitted from the printer 120 to the network card unit 110. FIG. 9 is a packet form of a reply packet transmitting Web contents data to the request packet instructing to read out Web contents data by a remote function call.

In FIG. 9, it is constituted by "Remote Procedure Call ID 901, Request/Answer Flag 902, Answer Status 903, Data Size 904, Request Web Contents Data 905".

"Remote Procedure Call ID 901" is an ID indicating a read out request of Web contents data, and it is a numerical value 100 (because it is to the request of FIG. 8) in FIG. 9. "Request/Answer Flag 902" indicates whether this packet is a request or a reply, and it is a numeral 1 (reply) in FIG. 9. "Answer Status 903" indicates that read out has been successfully done, and it is 1 (reply state) in FIG. 9. "Data Size 904" indicates the data size of the packet. "Request Web Contents Data 905" stores binary data of Web contents data.

The WWW server unit 113 analyzes the reply packet to take out Web contents data, and then transmits the Web contents data to the host computer 100 using an HTTP protocol.

Figure 6:
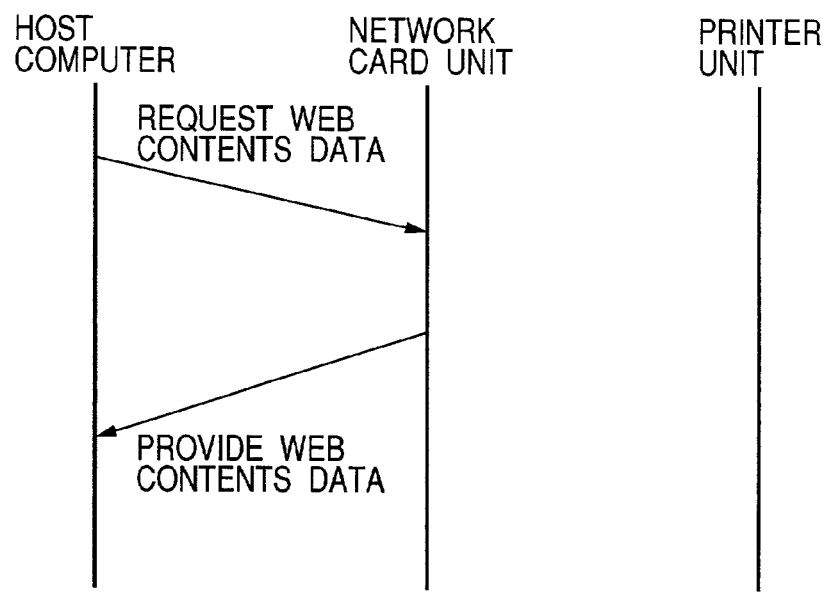
FIG. 6 is an operation in case that a host computer requests machine kind-independent Web contents data.
Figure 7:
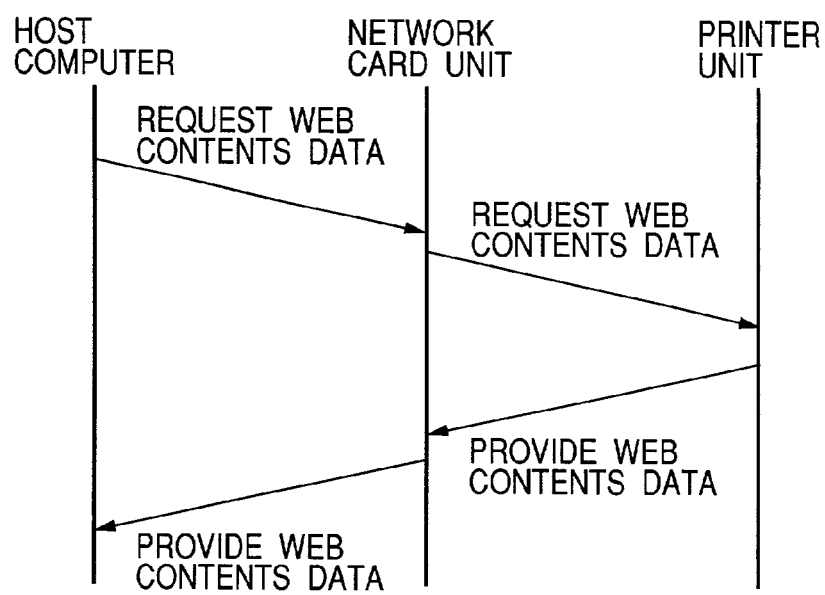
FIG. 7 is an operation in case that the host computer requests machine kind-dependent Web contents data.

Here, operations between modules will be described with time elapsing. FIGS. 6 and 7 are transition views showing how the acquisition of the requested Web contents data is performed. The axis of ordinates is time, and it indicates transition between request and reply of the host computer, the network card unit, and the printer unit.

FIG. 6 is an operation in case that the host computer requests machine kind-independent Web contents data. Since the Web contents data exists in the network card unit 110, any request to the printer is not generated and the Web contents data is taken out from the machine kind-independent contents data management unit 115 and then transmitted to the host computer 100.

FIG. 7 is an operation in case that the host computer requests machine kind-dependent Web contents data. Since the Web contents data exists in the printer 120, an request to the printer 120 is issued and the Web contents data is taken out from the machine kind-dependent contents data management unit 122 and then transmitted to the host computer 100.

In the above, the Web server unit 113 judged machine kind dependence or independence by whether or not the letter string (directory part) in which the path part has been removed from the URL includes "/dev/". However, not whether or not "/dev/" is included on the path, it has a letter string to be recognized as machine kind-dependent contents data, and a method of comparing with this can be mentioned.

Figure 10:
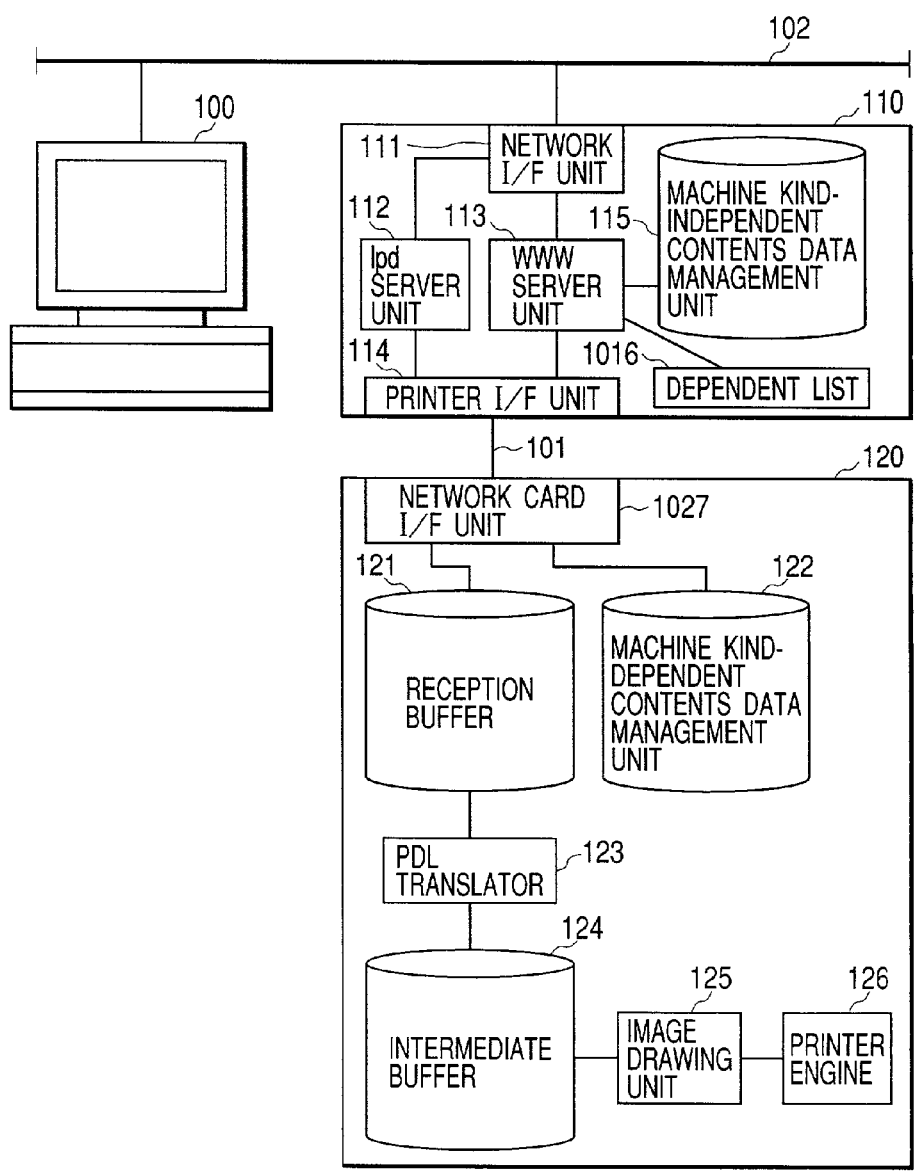
FIG. 10 is a typical view showing the construction of a printing system to which a dependent list has been newly added.

FIG. 10 is a typical view showing the construction of a printing system to which a dependent list 1016 has been newly added. The dependent list 1016 is a database storing a list of letter strings.

Figure 11:
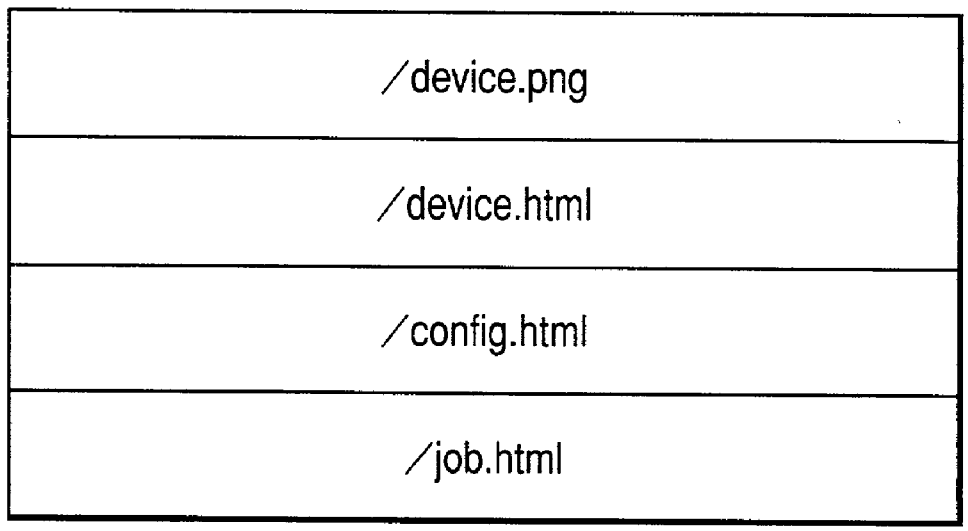
FIG. 11 is a view showing the contents of the dependent list.

FIG. 11 is a view showing the contents of the dependent list. For example, in FIG. 11, upon acquisition of the same Web contents data as one of these letter strings, a request of the Web contents data is issued to the printer, and in the other cases, the Web contents data is acquired from the interior of the network card unit.

Figure 12:
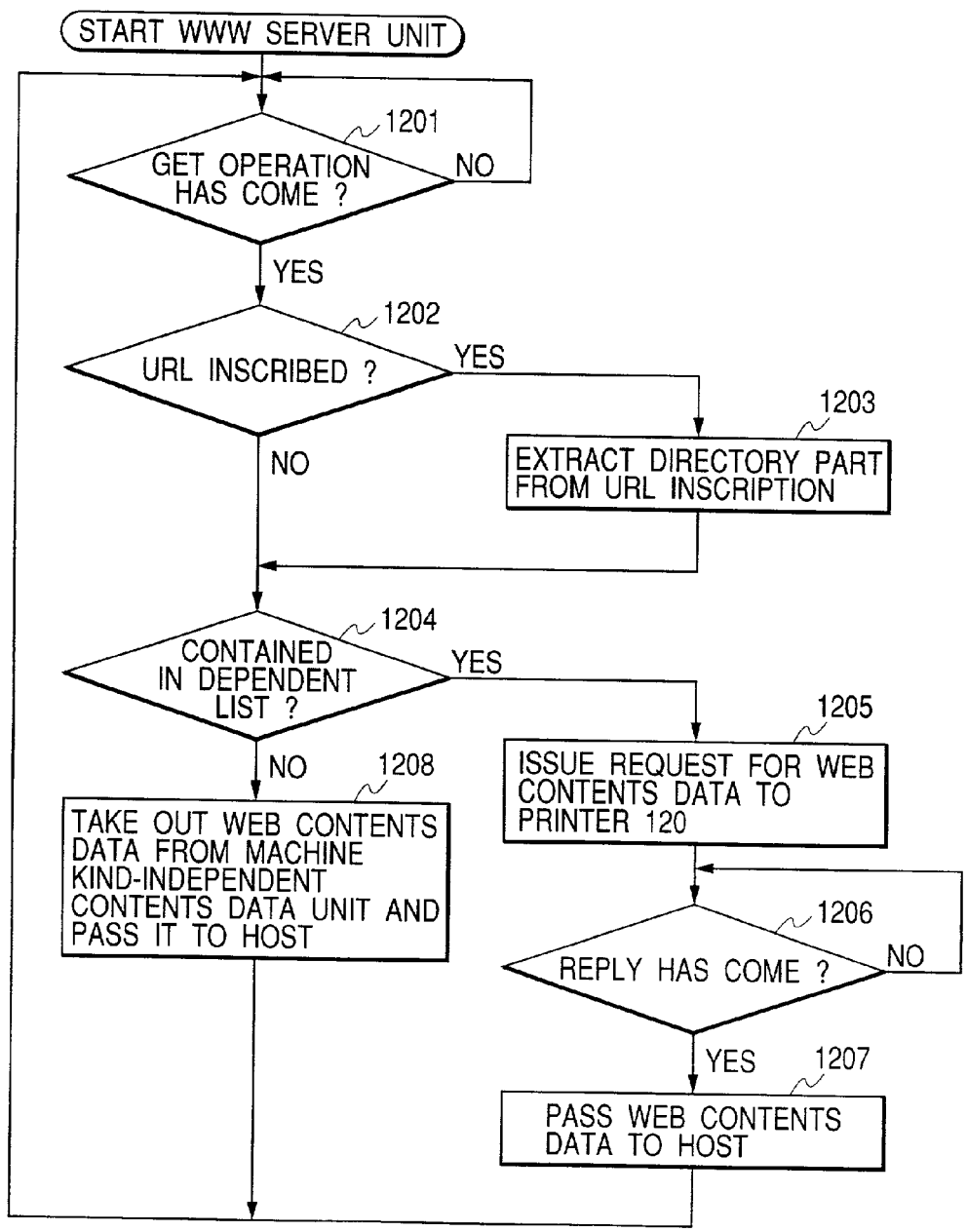
FIG. 12 is a flowchart showing an processing operation of the WWW server unit using the dependent list.

FIG. 12 is a flowchart showing an processing operation of the WWW server unit 113 using the dependent list. The difference from FIG. 5 is in judging conditions in step S1204, and checking whether or not the directory part is included in the dependent list is performed. By this, with making no bones about the path name or the directory structure, it is possible to set Web contents data with separating into machine kind dependence and machine kind independence.

The WWW server unit 113 is activated with the activation of the printer 120 and provides services continuously till the power source is cut off.

When a service is started, first, to wait for a GET operation, it is judged whether or not the GET operation has been received from the network (step S1201). The GET operation is an operation for requesting Web contents data in HTTP.

When the GET operation has come (step S1201—YES), it is checked what is the requested Web contents data, and it is checked whether or not it is URL-inscribed (step S1202). When being URL-inscribed (step S1202—YES), a directory part is extracted from the URL inscription (step S1203). For example, in case that the designated Web contents name is "http://printer.domain/device.html", "http://" is judged to be a scheme and "printer.domain" is judged to be a domain name. And, both are excluded and only "/device.html" is taken out as the directory part.

Further, it is checked whether or not the directory part exists in the dependent list (step S1204). As described above, any Web contents name existing in the dependent list is acquired from the printer as machine kind-dependent contents data.

Therefore, in case of existing in the dependent list (step S1204—YES), an acquisition request of the Web contents data is issued to the printer 120 (step S1205). And, by judging as to whether or not a reply has come (step S1206), the replay is waited for, and when the reply has come (step S1206—YES), by a reply form of HTTP, the requested Web contents data is transferred to the host computer 100. In case of not existing in the dependent list (step S1204—NO), since it is Web contents data owned by the network card unit 101, the Web contents data is acquired from the machine kind-independent contents data management unit 115 and by a reply form of HTTP, the Web contents data is provided to the host computer 100.

Note that an independent list may be had in place of the dependent list. In this case, in step S1204, it is judged whether or not it exists in the independent list, and in case of existing, the flow advances to step S1208, while in case of not existing, the flow advances to step S1205.

As described above, by classifying Web contents data into machine kind-dependent ones and machine kind-independent ones, and disperse-disposing the dependent ones within the printer 120 and the independent ones within the network card unit 110, the following effects can be obtained.

First, (1) the network card unit 110 need not have Web contents data in relation to all printer models to which its own machine may be connected, and it becomes possible to reduce the cost of the memory capacity of the network card unit 110.

(2) For the same reason, when coping with a printer that will be developed in a future, the network card unit 110 can cope without exchanging ROM.

(3) Since the WWW server unit 113 and machine kind-independent Web contents data exist in the network card unit 110, in case that the network card unit 110 is unnecessary, it becomes possible to suppress cost up of the printer 20.

Hereinafter, further, a method of displaying image data corresponding to the construction of equipment for information management of the equipment will be described.

FIG. 13 is a view showing a display screen on which a WWW browser being executed on the host computer 100 displays HTML contents data or bit map contents data provided by the WWW server unit 113.

In FIG. 13, the screen arrangement is divided into two frames, that is, a mode switching frame 1301 and a mode display frame 1351.

In the mode switching frame 1301, to display with mode-dividing the screen in a WWW service having many functions, buttons for urging to shift to each mode are disposed. There are the respective buttons of device management 1302, job management 1303, device management 1304, and support link 1305, and by depressing these buttons, shift to each mode is performed.

In the mode display frame 1351 of FIG. 13, a state frame of device management is displayed. From the upper part, a bit map icon 1352 indicating equipment, the name 1353 of the equipment, the condition 1354 of the equipment, information 1355 on a paper feeder, the condition 1356 of a paper discharge device, a bit map image 1357 showing the construction of the equipment, a button 1358 indicating activation of utility, and a button 1359 indicating activation of device control, are displayed.

Here, since the bit map image 1357 showing the construction of the equipment makes a display to correspond to the construction of actual equipment, the displayed image varies in accordance with attachment conditions of option equipment such as a paper feed cassette, a duplex, a paper discharge device, and so on.

Figure 14:
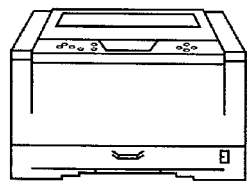
FIG. 14 is a view showing mountable equipment constructions in equipment.
Figure 14:
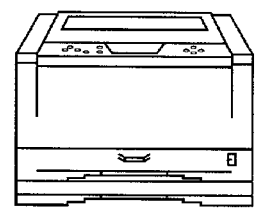
Figure 14:
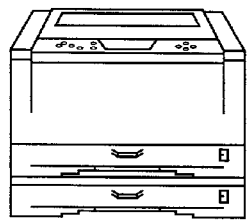
Figure 14:
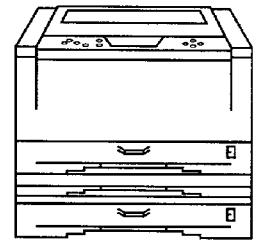
Figure 14:
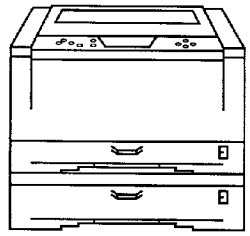
Figure 14:
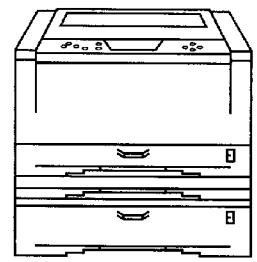

FIG. 14 is a view showing mountable equipment constructions in certain equipment. The equipment has one step of 250-sheets cassette in its standard construction. By option, one step of 250-sheets cassette or one step of 500-sheets cassette can be further connected. Besides, separately from it, a duplex printing device can be connected. The duplex printing device must sandwich a reversing device in the lower part of the main body to reverse a paper.

In the above specification, as possible combinations as equipment construction, there are six as in FIG. 14. In accordance with equipment, a paper discharging device can also be added and combinations further increases. FIG. 15 shows combinations of one step of 250-sheets cassette, one step of 500-sheets cassette, and duplex by a table.

Note that, in the printer 120, actual check of construction is judged by the printer engine 126 checking an electrical connection of a connector upon boot of the equipment.

The machine kind-dependent contents data management unit 122 holds the table of FIG. 15. And, it inquires of the printer engine 1026 the equipment construction upon boot of the equipment, selects a bit map image corresponding to the construction of the equipment by checking with the table of FIG. 15, and considers this an inquiry result of, for example, "image.png".

Thereupon, in response to a request of "/dev/image.png" from the host computer 100, after the server unit 113 checks the path construction to judge as machine kind-dependent contents data (step S504 of FIG. 5—YES), it issues a request of Web contents data to the machine kind-dependent contents data management unit 122 (step S505 of FIG. 5). In response to this, from the contents judged upon boot, the machine kind-dependent contents data management unit 122 selects a bit map image corresponding to the equipment construction out of bit map images 14-1 to 14-6, and replies its Web contents data.

By the above, even when the host computer 100 and the network card unit 110 do not know the current equipment construction of the printer 120, only by inquire a single Web contents name, they can acquire image data (bit map data) corresponding to the equipment construction of the printer 120.

Besides, there is a case that also HTML contents data changes in accordance with the equipment construction. For example, describing in relation to paper feed information 1355 of FIG. 13, this information indicates paper feed information in the cassette step connected to the equipment, and in accordance with the equipment construction at that time, display contents vary. For example, in case that there is no cassette of option, only a manual tray and an upper cassette are displayed. In case that there is a 250-sheets cassette or a 500-sheets cassette, the manual tray, the upper cassette, and a lower cassette are displayed.

In order to switch this display, a method of returning the HTML contents data that depends on unit configuration to the host computer by extending SSI (Server Side Include) that is a function of the WWW server unit is described.

The SSI is a technique that performs parsing to the Web contents data acquired the WWW server unit and converts the text described in a specific format, then transfers it to a client.

There is a method of comparing definitions of a variable as an SSI form. FIG. 19 is a drawing showing a format of the form (1: is a line number and used for a description).

In the first line, when the content of an environmental variable ENV is checked and the value is VALUE 1, syntax A is returned to the host computer. Otherwise, in the third line, when the content of the environmental variable ENV is rechecked and the value is VALUE 2, syntax B is returned to the host computer. Otherwise, syntax C is returned.

Here, when the ENV is a special variable "LOW-CASSETTE-EXIST", a WWW server unit 113 inquires of a device-dependent contents data management unit 122 whether the bottom cassette exists in a printer 120. This inquiry assumes state acquisition by a remote function call. However, if means for acquiring another device configuring means is available, it ought also be diverted (for example, a job control language interface or SNMP/MIB interface). As a result, if the bottom cassette is available, the WWW server unit 113 replaces the content of "LOW-CASSETTE-EXIST" by TRUE.

That is, if the WWW contents data is as shown in FIG. 20, only when the bottom cassette is available, an HTML notation regarding the bottom cassette is added to the Web contents data and can be returned to a host computer 100. Hereupon, a WWW browser also displays the paper feed information of the bottom cassette in accordance with the added HTML notation. This can also be diverted to paper ejection information 1356 as well as paper feed information 1355.

Static information, so to speak, in which a status is determined at activation like a paper feed unit is described. However, some information may change momentarily according to device status. Such dynamic information is described.

An example of the dynamic information shows a device status, such as a status 1354, in real time. There are a status LED, a status message, or a bitmap icon and a % display that indicate the remaining quantity of the paper for the paper feed information 1355 or a bitmap icon and a % display that indicate the residual quantity of the ejected paper for the paper ejection information 1356.

When the variable ENV is a special variable "STATUS_LED" or "STATUS_MESSAGE", each variable indicates a file name of a bitmap image that indicates the status LED according to the device status or a message according to the device status. Accordingly, after the WWW server unit converts each variable to a file name and a message, it transfers the Web contents data to the host computer.

When the WWW server unit 113 retrieves a variable in the SSI and detects "STATUS_LED", it acquires a condition code that indicates the current condition of the printer 120 and acquires a device-unique message (message indicating "Printable" in FIG. 13) that corresponds to the condition code, then returns the message to the host computer. The device-unique message is held in a device-dependent contents data management unit 22. The WWW server unit 113 is called using the dedicated remote function call and acquires a message.

The dynamic information is transferred to the host computer after it has been reloaded (reread) by the WWW browser of the host computer or it is updated automatically after a specified refresh time in the HTML.

As described above, even if a dynamic status change occurs in a printer. the host computer can receive the LED image data and messages that correspond to the status. Accordingly, the same effects as printer utilities can be obtained using the Web browser of the host computer.

Figure 17:
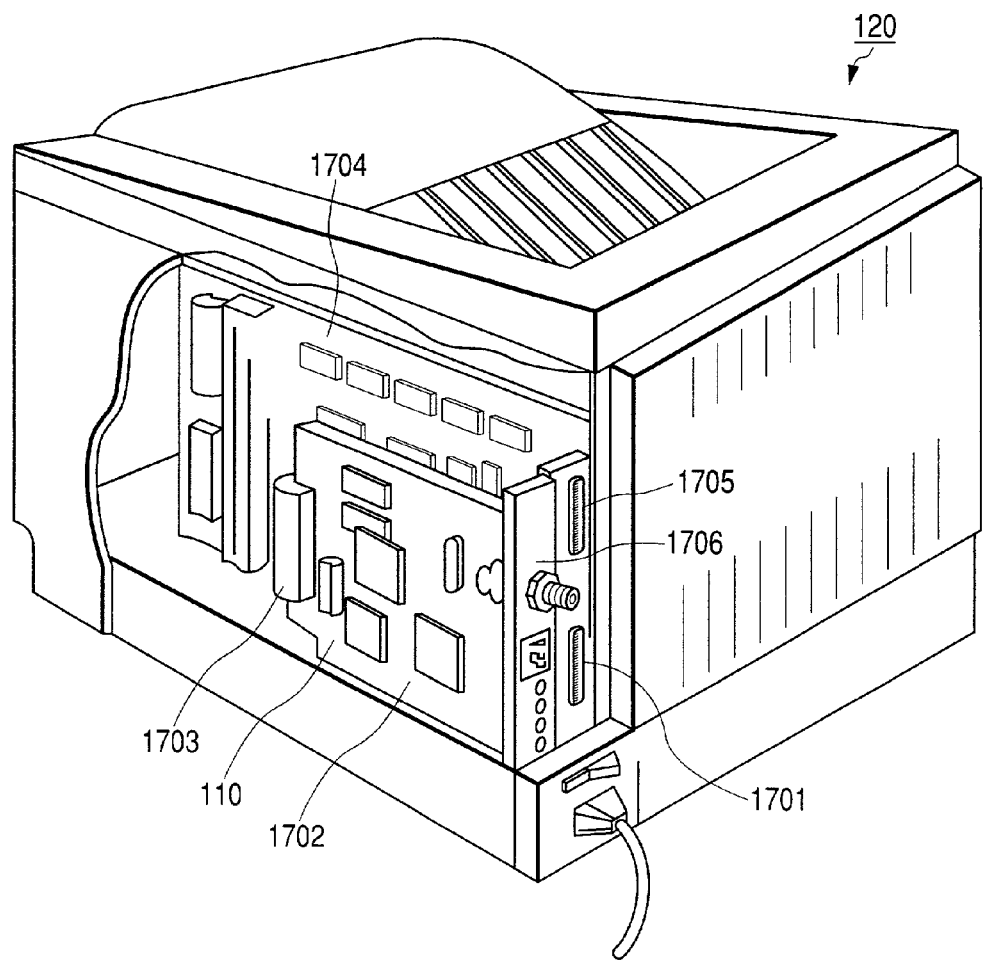
FIG. 17 is a partially cut view showing a state that a network card unit is installed in a printer.

FIG. 17 is a partially cutaway view showing the status in which a network card unit 110 is installed in the printer 120. As shown in FIG. 17, the network card unit 110 is provided with a printing circuit board 1702 in which a faceplate 1701 is installed for network connection and connected to a printer interface card 1704 via a connector 1703.

The printer interface card 1704 directly controls the printer engine of the printer 120. Print data and a printer status command are input from the network card unit 110 to the printer interface card 1704 via the connector 1703, and printer status information is also obtained from the printer interface card 1704 via the connector 1703. The network card unit 110 communicates this information over a network 102 via the network connector of the faceplate 1701. At the same time, the printer 120 can also receive the print data from a serial port 1705 and a parallel port 1706.

Figure 18:
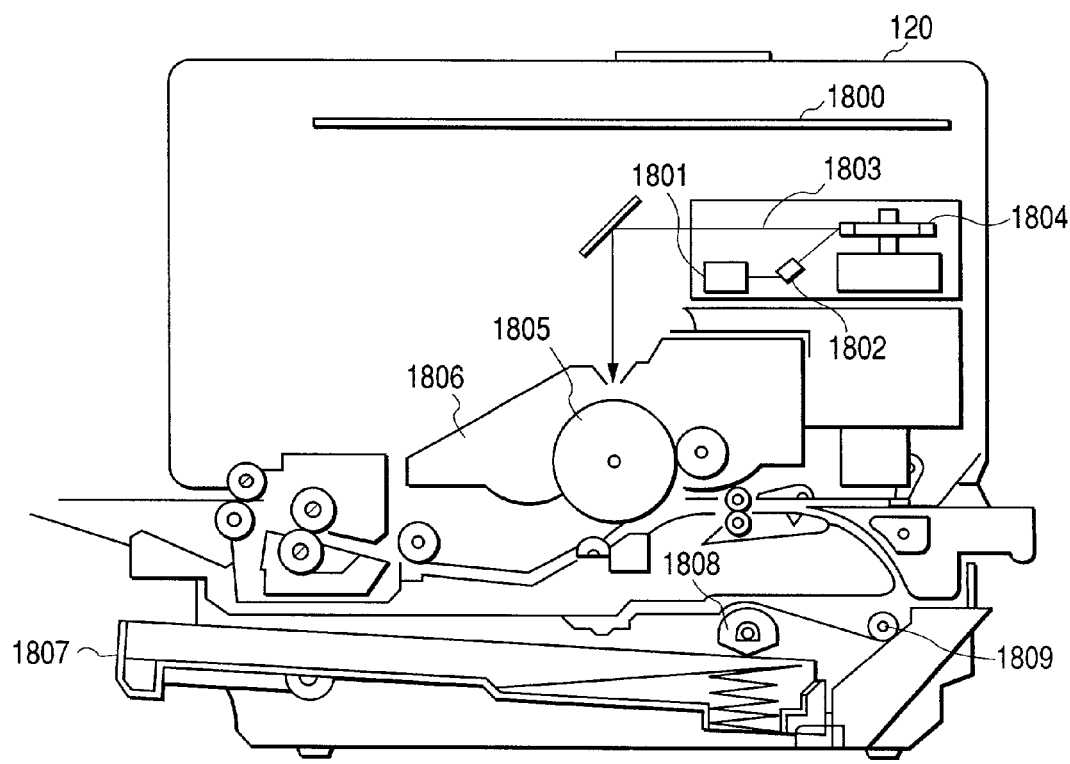
FIG. 18 is a sectional view showing the internal construction of a laser beam printer as an example of printer.

Further, FIG. 18 is a sectional view showing the internal structure of a laser beam printer that is an example of the printer 120. The sectional view chiefly shows the configuration of a printer engine 126. A laser driver 1801 is a circuit for driving a semiconductor laser 1802 and switches on and off laser beam 1803 irradiated from the semiconductor laser 1802 in accordance with a video signal a control unit 1800 outputs.

The laser beam 1803 is deflected to the left and right directions by a rotary polygonal mirror 1804 and scans the top of an electrostatic drum 1805. This forms an electrostatic latent image, such as a character pattern, on the electrostatic drum 1805. After this latent image has been developed by a developing unit 1806 around the electrostatic drum 1805, it is transferred to recording paper.

A cut sheet is used as this recording paper. Cur sheet recording paper is housed in a paper cassette 1807 installed in the laser printer 102. The paper is guided into the device by a paper feed roller 1808 and a transport roller 1809 and supplied to the electrostatic drum 1805.

A printer is described above as an example. Needless to say, the present invention is applied to not only the printer but also can be applied to but also a peripheral device or a device, such as a copier, a multifunction printer, a scanner, and a facsimile system.

As described above, needless to say, an object of the present invention is also attained by supplying a software program (for example, program that corresponds to the flowchart of FIG. 5 or 12) of software that implements the function of the previously described embodiment to a system or device and allowing the computer (or CPU or MPU) of the system or device to read and execute the program stored in a storage medium.

In this case, the program itself read from the storage medium implements a new function of the present invention and the program and the storage medium that stores the program will construct the present invention.

As the storage medium for supplying the program, for example, a floppy disk, hard disk, optical disk, magneto-optical disk, CD-ROM, CD-R, magnetic tape, nonvolatile memory card, ROM, or EEPROM can be used.

Further, needless to say, an object of the present invention is also attained by supplying a program software that implements the function of the previously described embodiment to a system or device via a network, such as electronic mail or network communication, and allowing the computer (or CPU or MPU) of the system or device to read and execute the program stored in a storage medium.

Further, needless to say, the case where the function of the previously described embodiment is not only realized by executing a program the computer reads out but also an OS (operating system) that is operating on the computer performs part or all of real processing based on the instruction of the program and the function of the previously described embodiment is realized by the processing is also included.

Moreover, needless to say, after the program read from the storage media has been written in a memory provided in a function expansion board inserted into a computer and a function expansion unit connected to the computer, the case where the CPU provided in the function expansion board and function expansion unit performs part or all of real processing and the function of the previously embodiment is realized by the processing is also included.

As described above, the following effects can be obtained by classifying the Web contents data into device-dependent data and device-independent data and decentralizing and arranging the device-dependent data in the printer and the device-independent data in the network card unit according to the present invention.

To begin with, the effects are as follows:

(1) The network card unit need not have the Web contents data regarding all printer models to which a local machine may possibly be connected and the cost of the memory capacity of the network card unit can be reduced.

(2) For the same reason, the network card unit can be applied without replacing any ROM when it is applied to a printer that will be developed in future.

(3) Because the WWW server unit and the device-independent Web contents data are provided in the network card unit, the cost increase of the printer can be suppressed if the network card unit is unnecessary.

Further, according to the present invention, the host computer and the network card unit can acquire the image data (bitmap data) that corresponds to the device configuration of the printer only by inquiring a single Web contents name even if the current device configuration of the printer is identified. Otherwise, even if a dynamic status change occurs in the printer, the host computer can receive the LED image data and messages that correspond to the status.

What is claimed is:

1. An information management apparatus for transmitting data indicating information on a device to an external apparatus, comprising:

a storage unit, adapted for storing data indicating information on the device, the stored data being not dependent on a machine kind of the device;

an acquisition unit, adapted for acquiring the data from said storage unit when the data to be transmitted to the external apparatus is not dependent upon the machine kind of the device, and acquiring the data indicating information on the device from a storage unit in the device when the data to be transmitted to the external apparatus is dependent upon the machine kind of the device, wherein the data dependent upon the machine kind of the device changes in accordance with an attachment condition of option equipment at the device and indicates information on the option equipment which is attached at the device; and a transmission control unit, adapted for transmitting the data acquired by said acquisition unit to the external apparatus, wherein the data stored in said storage unit of said information management apparatus is not acquired from the device.

2. The information management apparatus according to claim 1, wherein, when the data is dependent upon the machine kind of the device, said acquisition unit transmits a request of data to the device, and receives the data from the device.

3. The information management apparatus according to claim 1, further comprising:

a judgment unit, adapted to transmit data in response to a request from said external apparatus, and to judge, on the basis of data identification information, included in the request, as to whether the requested data is stored in said storage unit in said information management apparatus or stored in the storage unit in the device, wherein, in accordance with a judgment result by said judgment unit, said acquisition unit acquires the data from said storage unit in said information management apparatus or the storage unit in the device.

4. The information management apparatus according to claim 3, wherein the data identification information is a path name, and
wherein said judgment unit judges, on the basis of a directory part included in the path name, as to whether the requested data is stored in said storage unit in said information management apparatus or stored in the storage unit in the device.

5. The information management apparatus according to claim 1, further comprising:
a judgment unit adapted to judge, on the basis of a list indicating the data dependent upon the machine kind of the device, as to whether the data is stored in said storage unit in said information management apparatus or stored in said storage unit in the device,
wherein, in accordance with a judgment result by said judgment unit, said acquisition unit acquires the data from said storage unit in said information management apparatus or said storage unit in the device.

6. The information management apparatus according to claim 3, wherein the identification information is URL-inscribed.

7. The information management apparatus according to claim 1, wherein the data is transmitted to said external apparatus, based on HTTP.

8. The information management apparatus according to claim 1, wherein a network board is attached to the device.

9. The information management apparatus according to claim 1, wherein the data is requested from said external apparatus, based on document data for display for displaying information on the device by a browser.

10. The information management apparatus according to claim 1, wherein the device is a laser beam printer.

11. An information management method for transmitting data indicating information on a device to an external apparatus, comprising:
an acquisition step of acquiring the data from a storage unit in an information management apparatus connected to the device when the data to be transmitted to the external apparatus is not dependent upon a machine kind of the device, and acquiring the data indicating information on the device from a storage unit in the device when the data to be transmitted to the external apparatus is dependent upon the machine kind of the device, wherein the data dependent upon the machine kind of the device changes in accordance with an attachment condition of option equipment at the device and indicates information on the option equipment which is attached at the device; and
a transmission control step of transmitting so that the data acquired in said acquisition step to the external apparatus,
wherein the data stored in the storage unit of the information management apparatus is not acquired from the device.

12. The information management method according to claim 11, wherein, when said data is dependent upon the machine kind of the device, the acquisition step transmits a request of data to the device, and receives the data from the device.

13. The information management method according to claim 11, further comprising:
a judgment step of transmitting data in response to a request from said external apparatus, and judging, on the basis of data identification information, included in the request, as to whether the requested data is stored in said storage unit in said information management apparatus or stored in the storage unit in the device,
wherein, in accordance with a judgment result by said judgment step, said acquisition step acquires the data from said storage unit in said information management apparatus or the storage unit in the device.

14. The information management method according to claim 13, wherein the data identification information is a path name, and
wherein said judgment step judges, on the basis of a directory part included in the path name, as to whether the requested data is stored in said storage unit in said information management apparatus or stored in the storage unit in the device.

15. The information management method according to claim 11, further comprising:
a judgment step of judging, on the basis of a list indicating the data dependent upon the machine kind of the device, as to whether the data is stored in said storage unit in said information management apparatus or stored in said storage unit in the device,
wherein, in accordance with a judgment result by said judgment step, said acquisition step acquires the data from said storage unit in said information management apparatus or said storage unit in the device.

16. The information management method according to claim 13, wherein the identification information is URL-inscribed.

17. The information management method according to claim 11, wherein the data is transmitted to said external apparatus, based on HTTP.

18. The information management method according to claim 11, wherein said information management method is executed on a network board attached to the device.

19. The information management method according to claim 11, wherein the data is requested from said external apparatus, based on document data for display for displaying information on the device by a browser.

20. The information management method according to claim 11, wherein the device is a laser beam printer.

21. A computer-readable memory medium in which a program for transmitting data indicating information on a device to an external apparatus is stored, said program causing a computer to execute:
an acquisition step of acquiring the data from a storage unit in an information management apparatus connected to the device when the data to be transmitted to the external apparatus is not dependent upon a machine kind of the device, and acquiring the data indicating information on the device from a storage unit in the device when the data to be transmitted to the external apparatus is dependent upon the machine kind of the device, wherein the data dependent upon the machine kind of the device changes in accordance with an attachment condition of option equipment at the device and indicates information on the option equipment which is attached at the device; and
a transmission control step of transmitting the data acquired in said acquisition step to the external apparatus,
wherein the data stored in the storage unit of the information management apparatus is not acquired from the device.

22. The memory medium according to claim 21, wherein, when said data is dependent upon the machine kind of the device, the acquisition step transmits a request of data to the device, and receives the data from the device.

23. The memory medium according to claim 21, said program causing the computer to further execute:
- a judgment step of transmitting data in response to a request from said external apparatus, and judging, on the basis of data identification information, included in the request, as to whether the requested data is stored in said storage unit in said information management apparatus or stored in the storage unit in the device,
- wherein, in accordance with a judgment result by said judgment step, said acquisition step acquires the data from said storage unit in said information management apparatus or the storage unit in the device.

24. The memory medium according to claim 23, wherein the data identification information is a path name, and
- wherein said judgment step judges, on the basis of a directory part included in the path name, as to whether the requested data is stored in said storage unit in said information management apparatus or stored in the storage unit in the device.

25. The memory medium according to claim 21, said program causing the computer to further execute:
- a judgment step of judging, on the basis of a list indicating the data to be transmitted to the external apparatus is not dependent upon the machine kind of the device, as to whether the data is stored in said storage unit in said information management apparatus or stored in said storage unit in the device,
- wherein, in accordance with a judgment result by said judgment step, said acquisition step acquires the data from said storage unit in said information management apparatus or said storage unit in the device.

26. The memory medium according to claim 23, wherein the identification information is URL-inscribed.

27. The memory medium according to claim 21, wherein the data is transmitted to said external apparatus, based on HTTP.

28. The memory medium according to claim 21, wherein said information management method is executed on a network board attached to the device.

29. The memory medium according to claim 21, wherein the data is requested from said external apparatus, based on document data for display for displaying information on the device by a browser.

30. The memory medium according to claim 21, wherein the device is a laser beam printer.

31. An information management program, stored on a computer-readable medium, for transmitting data indicating information on a device to an external apparatus, comprising:
- a storing step of storing data indicating information on the device, the stored data being not dependent on a machine kind of the device;
- an acquisition step of acquiring the data from said storage unit when the data to be transmitted to the external apparatus is not dependent upon the machine kind of the device, and acquiring the data indicating information on the device from a storage unit in the device when the data to be transmitted to the external apparatus is dependent upon the machine kind of the device, wherein the data dependent upon the machine kind of the device changes in accordance with an attachment condition of option equipment at the device and indicates information on the option equipment which is attached at the device and
- a transmission control step of transmitting the data acquired in said acquisition step to the external apparatus,
- wherein the data stored by said storing step in said storage unit of said information management apparatus is not acquired from the device.

* * * * *

UNITED STATES PATENT AND TRADEMARK OFFICE
CERTIFICATE OF CORRECTION

PATENT NO. : 7,246,153 B2
APPLICATION NO. : 10/023747
DATED : July 17, 2007
INVENTOR(S) : Tsuchitoi It is certified that error appears in the above-identified patent and that said Letters Patent is hereby corrected as shown below:

TITLE PAGE:
Item (56), under
Foreign Patent Documents, "2000-149632" should read -- 2000-148632 --.

COLUMN 1:
Line 12, "management the" should read -- management of the --;
Line 14, "Internet," should read -- the Internet --; and
Line 18, "in case" should read -- in the case --.

COLUMN 2:
Line 7, "provides," should read -- provides --;
Line 14, "possible, even" should read -- possible. Even --;
Line 23, "case" should read -- the case --;
Line 27, "those all" should read -- the --;
Line 58, "for, when" should read -- for when --; and
Line 61, "data," should read -- data. --.

COLUMN 4:
Line 36, "message," should read -- message --; and
Line 66, "an" should read -- a --.

COLUMN 6:
Line 19, "indicated" should read -- indicates --;
Line 27, "an" should read -- a --;
Line 40, "an" should read -- an --; and
Line 63, "are" should read -- is --.

COLUMN 7:
Line 13, "exists" should read -- it exists --;
Line 28, "screen" should read -- the display screen --;
Line 35, "staring" should read -- starting --;
Line 35, "case" should read -- the case --;
Line 39, "staring" should read -- starting --;
Line 53, "what is the requested Web contents data," should read -- for what the requested Web contents data is, --;
Line 57, "case that" should read -- a case wherein --; and
Line 66, "case" should read -- the case --.

UNITED STATES PATENT AND TRADEMARK OFFICE
CERTIFICATE OF CORRECTION

PATENT NO.       : 7,246,153 B2
APPLICATION NO.  : 10/023747
DATED            : July 17, 2007
INVENTOR(S)      : Tsuchitoi It is certified that error appears in the above-identified patent and that said Letters Patent is hereby corrected as shown below:

COLUMN 8:
Line 2, "replay" should read -- reply --;
Line 5, "case that" should read -- a case wherein --;
Line 6, "staring" should read -- starting --;
Line 12, "case that" should read -- a case wherein --;
Line 24, "803," should read -- 803 and --;
Line 26, "read out" should read -- readout --;
Line 41, "904," should read -- 904 and --;
Line 43, "read out" should read -- readout --;
Line 47, "read out" should read -- readout --;
Line 63, "that" should be deleted.

COLUMN 9:
Line 3, "that" should be deleted;
Line 5, "an" should read -- a --;
Line 13, "not" should be deleted;
Line 27, "an" should read -- a --;
Line 31, "in" should read -- and --;
Line 45, "what is the requested Web contents data" should read -- for what the requested data is, --;
Line 49, "case that" should read -- a case wherein --;
Line 52, "name. And," should read -- name, and --;
Line 59, "case" should read -- the case --;
Line 63, "replay" should read -- reply --; and
Line 65, "case" should read -- the case --.

COLUMN 10:
Line 7, "case" should read -- the case --;
Line 8, "case" should read -- the case --;
Line 25, "in case that" should read -- in a case wherein --;
Line 32, "bit map" should read -- bitmap --;
Line 46, "bit map" should read -- bitmap --;
Line 49, "bit map" should read -- bitmap --;
Line 54, "bit map" should read -- bitmap --;
Line 62, "250-sheets" should read -- a 250-sheets --;
Line 63, "250-sheets" should read -- a 250-sheets --; and
Line 64, "500-sheets" should read -- a 500-sheets --.

UNITED STATES PATENT AND TRADEMARK OFFICE
CERTIFICATE OF CORRECTION

| | |
|---|---|
| PATENT NO. | : 7,246,153 B2 |
| APPLICATION NO. | : 10/023747 |
| DATED | : July 17, 2007 |
| INVENTOR(S) | : Tsuchitoi |

It is certified that error appears in the above-identified patent and that said Letters Patent is hereby corrected as shown below:

COLUMN 11:
Line 4, "increases" should read -- increase --;
Line 5, "250- sheets" should read -- a 250-sheets --;
Line 6, "500- sheets" should read -- a 500-sheets --;
Line 13, "bit map" should read -- bitmap --;
Line 25, "bit map" should read -- bitmap --;
Line 30, "inquire" should read -- inquiring of --;
Line 31, "(bit map" should read -- (bitmap --;
Line 34, "that" should read -- wherein --;
Line 40, "case that" should read -- a case wherein --; and
Line 42, "case that" should read -- a case wherein --.

COLUMN 12:
Line 21, "are" should read -- is --;
Line 23, "indicate" should read -- indicates --; and
Line 49, "printer. the" should read -- printer, the --.

COLUMN 13:
Line 18, "Cur" should read -- Cut --;
Line 25, "but also" should be deleted;
Line 30, "program" should read -- the program --;
Line 33, "allowing" should read -- allows --;
Line 48, "allowing" should read -- allows --; and
Line 51, 'the case" should read -- in a case --.

COLUMN 14:
Line 12, "future." should read -- the future. --; and
Line 20, "inquiring" should read -- inquiring of --.

UNITED STATES PATENT AND TRADEMARK OFFICE
CERTIFICATE OF CORRECTION

PATENT NO. : 7,246,153 B2
APPLICATION NO. : 10/023747
DATED : July 17, 2007
INVENTOR(S) : Tsuchitoi It is certified that error appears in the above-identified patent and that said Letters Patent is hereby corrected as shown below:

COLUMN 15:
Line 65, "information," should read -- information --.

COLUMN 16:
Line 37, "apparatus," should read -- apparatus --.

COLUMN 17:
Line 5, "information," should read -- information --.

Signed and Sealed this

Fourth Day of November, 2008

JON W. DUDAS
*Director of the United States Patent and Trademark Office*